(12) United States Patent
Tokunaga

(10) Patent No.: US 10,969,175 B2
(45) Date of Patent: Apr. 6, 2021

(54) SETTER FOR FIRING, AND METHOD FOR PRODUCING HONEYCOMB STRUCTURE USING SETTER FOR FIRING

(71) Applicant: NGK INSULATORS, LTD., Nagoya (JP)

(72) Inventor: Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 217 days.

(21) Appl. No.: 16/043,412

(22) Filed: Jul. 24, 2018

(65) Prior Publication Data

US 2018/0328667 A1 Nov. 15, 2018

Related U.S. Application Data

(63) Continuation of application No. PCT/JP2016/088677, filed on Dec. 26, 2016.

(30) Foreign Application Priority Data

Feb. 23, 2016 (JP) .............................. JP2016-032447

(51) Int. Cl.
*F27D 5/00* (2006.01)
*C04B 38/00* (2006.01)
(Continued)

(52) U.S. Cl.
CPC ............ *F27D 5/0031* (2013.01); *B01J 35/04* (2013.01); *B28B 3/20* (2013.01); *B28B 11/243* (2013.01);
(Continued)

(58) Field of Classification Search
CPC .... F27D 5/0006; F27D 3/0021; F27D 5/0012; C04B 35/64; C04B 38/0006
See application file for complete search history.

(56) References Cited

U.S. PATENT DOCUMENTS 2,246,448 A * 6/1941 Mahan, Jr. ............ F27D 5/0012
432/259
4,786,542 A * 11/1988 Yasuda ................... C04B 33/32
156/89.22

(Continued)

FOREIGN PATENT DOCUMENTS

| JP | S62-202870 A1 | 9/1987 |
|---|---|---|
| JP | H06-211568 A1 | 8/1994 |

(Continued)

OTHER PUBLICATIONS

International Search Report and Written Opinion (Application No. PCT/JP2016/088677) dated Jan. 31, 2017.

*Primary Examiner* — Gregory A Wilson
(74) *Attorney, Agent, or Firm* — Burr & Brown, PLLC

(57) ABSTRACT

A setter for firing in a plate which is used for firing a honeycomb formed body and interposed between the honeycomb formed body and a shelf plate, wherein the setter for firing has a setter lower surface section facing the shelf plate, the setter lower surface section including: a central region part formed by a region including a lower surface center of the setter lower surface section; and a peripheral region part formed by a peripheral region of the central region part, and the peripheral region part has at least four or more setter groove parts each having a recessed cross sectional shape and extending radially from the lower surface center respectively in a direction from a boundary with the central region part toward a setter outer circumferential section.

9 Claims, 8 Drawing Sheets

(51) Int. Cl.
*C04B 35/64* (2006.01)
*C04B 35/185* (2006.01)
*B01J 35/04* (2006.01)
*B28B 3/20* (2006.01)
*B28B 11/24* (2006.01)
*F01N 3/28* (2006.01)

(52) U.S. Cl.
CPC ............ *C04B 35/185* (2013.01); *C04B 35/64* (2013.01); *C04B 38/0006* (2013.01); *B28B 2003/203* (2013.01); *C04B 2235/77* (2013.01); *C04B 2235/94* (2013.01); *C04B 2235/95* (2013.01); *C04B 2235/96* (2013.01); *C04B 2235/963* (2013.01); *C04B 2235/9623* (2013.01); *F01N 3/2828* (2013.01)

(56) References Cited

U.S. PATENT DOCUMENTS

| | | | |
|---|---|---|---|
| 7,008,220 B2 * | 3/2006 | Nakano | C04B 35/565 |
| | | | 264/629 |
| 9,279,618 B2 * | 3/2016 | Hanzawa | C04B 35/565 |
| 10,265,881 B2 * | 4/2019 | Kitaguchi | B01J 37/08 |
| 10,479,734 B2 * | 11/2019 | Beall | C04B 35/478 |

FOREIGN PATENT DOCUMENTS

| | | |
|---|---|---|
| JP | H07-015738 U | 3/1995 |
| JP | 2005-219977 A1 | 8/2005 |

* cited by examiner

| | SHAPE | THE NUMBER OF GROOVES | RADIATION ANGLE θ | CENTER DIAMETER (mm) | GROOVE WIDTH (mm) | GROOVE AREA RATIO (%) | SUCTION | SHAPE CHANGE AFTER FIRING | PRODUCT QUALITY |
|---|---|---|---|---|---|---|---|---|---|
| EX. 1 |  | 4 | 90° | 25 | 2 | 3.5 | B | B | B |
| EX. 2 |  | 5 | 72° | 25 | 2 | 4.3 | A | A | A |
| EX. 3 |  | 6 | 60° | 25 | 2 | 5.2 | A | A | A |
| EX. 4 |  | 8 | 45° | 25 | 2 | 6.9 | A | A | A |
| EX. 5 |  | 6 | 60° | MINOR AXIS 25 | 2 | 1.2 | A | A | A |
| EX. 6 |  | 6 | 60° | 10 | 2 | 6.1 | A | A | A |
| EX. 7 |  | 6 | 60° | 35 | 2 | 4.6 | B | A | A |
| EX. 8 |  | 6 | 60° | 25 | 2 | 1.2 | A | A | A |
| EX. 9 |  | 6 | 60° | 25 | 0.5 | 1.3 | A | A | A |

| | SHAPE | THE NUMBER OF GROOVES | RADIATION ANGLE θ | CENTER DIAMETER (mm) | GROOVE WIDTH (mm) | GROOVE AREA RATIO (%) | SUCTION | SHAPE CHANGE AFTER FIRING | PRODUCT QUALITY |
|---|---|---|---|---|---|---|---|---|---|
| COM EX.P. 1 |  | 1 | – | – | 2 | 2.2 | B | C | C |
| COM EX.P. 2 |  | 2 | – | – | 2 | 5.5 | B | C | B |
| COM EX.P. 3 |  | 4 | – | – | 2 | 10.9 | B | C | C |
| COM EX.P. 4 |  | 6 | 60° | 0 | 2 | 6.6 | A | C | C |
| COM EX.P. 5 |  | 6 | 60° | 25 | 0.3 | 0.8 | C | A | A |
| COM EX.P. 6 |  | 6 | 60° | 25 | 5 | 13.0 | A | B | C |

SETTER FOR FIRING, AND METHOD FOR PRODUCING HONEYCOMB STRUCTURE USING SETTER FOR FIRING

BACKGROUND OF THE INVENTION

1. Field of the Invention

The present invention relates to a setter for firing and a method for producing a honeycomb structure using the setter for firing. More specifically, the present invention relates to a setter for firing laid under a honeycomb formed body for firing an unfired honeycomb formed body in a firing furnace, and to a method for producing a honeycomb structure using the setter for firing (hereinafter, simply referred to as a "method for producing a honeycomb structure").

2. Description of Related Art

Conventionally, ceramic honeycomb structures have been used for various applications, such as catalyst carriers for purifying automobile exhaust gas, diesel particulate removing filters, or heat storage bodies for combustion device. The ceramic honeycomb structure (hereinafter, simply referred to as "honeycomb structure") is produced by adjusting a molding material (kneaded material), extruding the molding material into a desired honeycomb shape by using an extruder, subjecting the extruded material to raw cutting, drying, and finish cutting, and then passing the resultant material through a firing step of firing it at a high temperature.

In the firing step carried out in the method for producing the honeycomb structure, the honeycomb formed body is placed on a shelf plate with one end face of the formed body directed downwardly and is thrown into a firing furnace together with the shelf plate. At this time, for preventing the honeycomb formed body from adhering to the shelf plate and for improving a quality of an end face of a product, between the shelf plate and the honeycomb formed body, a planking for firing called "setter" is interposed to prevent the honeycomb formed body and the shelf plate from directly contacting with each other. As the setter, for example, a setter called "press setter" obtained by press molding a ceramic material and firing the molded material is sometimes used. Here, in this Description, setters including "press setters" are collectively called "setters for firing" and are defined. In addition, the molding material from the extrusion until before the firing is called a "honeycomb formed body", and the honeycomb formed body fired after passing through the firing step is called a "honeycomb structure".

Note that, of setters for firing to be used for firing the honeycomb formed body, there is also proposed a setter for firing that suppresses occurrence of failures, such as partition wall cutting in the honeycomb formed body or deformation of cell, by decreasing the difference in heat stress or firing shrinkage between the honeycomb formed body and the setter for firing at the time of firing and can maintain a high yield (refer to Patent Document 1). According to this, a concave portion is provided on a surface facing the shelf plate and further a ratio of a contact area with the shelf plate or the like is prescribed in a predetermined range.

CITATION LIST

Patent Document

[Patent Document 1] JP-A-2005-219977

SUMMARY OF THE INVENTION

Problem to be Solved by the Invention

In a case where a honeycomb formed body is fired by using a setter for firing, it is required to perform a work of placing a plurality of setters for firing in an aligned state on a shelf plate or recovering the setters for firing on the shelf plate after taking out a honeycomb structure after firing. Generally, setters for firing are stored in a storage case in a state of being stacked vertically in multiple stages and conveyed to the vicinity of the shelf plate.

Then, a worker performs a work of taking out the setters for firing one by one from the storage case and aligning them manually. Similarly, a work of recovering setters for firing into the storage case is performed manually in many cases. Hence, these works are great burden for the worker.

In addition, since these works are manual works and take long working hours, there have been problems, such as reduction in manufacturing efficiency and positional accuracy, such as positional shift in arranging the setters for firing in alignment. Therefore, for the purposes of reduction in work load of workers, improvement in manufacturing efficiency by reduction of working hours, and improvement of working accuracy, attempts to automate works related to placement of the setters for firing and the like are examined.

For example, it is examined to use a robot arm capable of reproducing a preprogrammed motion by using an existing robot control device. In this case, it becomes possible to place and align the setters for firing on the shelf plate and further recover them from the shelf plate by holding a setter outer circumferential section of the setter for firing from a side by opening/closing a pair of holding parts of the robot arm. At this time, to hold the setter for firing from the side by the holding parts of the robot arm, a certain amount of space is necessary around the setter for firing (stacked body).

However, as described above, a plurality of setters for firing are stored in the storage case in a state of stacked body in which they are stacked in multiple stages, and further, around one stacked body, other stacked bodies are stored densely.

Consequently, there is a high possibility that the holding parts contact the stacked bodies positioned around the setter for firing as a holding target or a part of the storage case, and thus the setter for firing may not be held stably from the storage case. That is, automation of work, such as placement of a setter for firing by using a robot arm, may be limited.

In contrast to this, it is expected to use a sucking-conveying device 101 that conveys a setter for firing 100 by using suction force and performs placement (refer to FIG. 10). In this case, the sucking-conveying device 101 includes a sucker-like suction section 102 formed of rubber or the like at the tip of the arm, and closely contacts the suction section 102 with a setter upper surface section 103 of the setter for firing 100 and sucks air inside the suction section 102 to reduce the pressure. This makes the pressure in a space inside the suction section 102 lower than the atmospheric pressure and closely contacts the setter for firing 100 with the suction section 102.

The setter for firing 100 is lifted in conjunction with movement of the suction section 102 by moving the arm upward in this state. Consequently, the setter for firing 100 can be conveyed to any position. Note that, after it is conveyed to a predetermined position, the suction by the suction section 102 is stopped and the suction state is released. That is, the pressure of air inside the suction section 102 is returned to the atmospheric pressure. This eliminates adhesion between the setter for firing 100 and the suction section 102 and allows placement of the setter for firing 100 on the shelf plate or the like. Use of the sucking-conveying device 101 enables automation of the work, such as placement of the setter for firing 100.

Particularly, even in a case of lifting the setter for firing 100 from the stacked body 104 in which a plurality of setters for firing 100 are stacked in multiple stages, the suction section 102 and the arm are moved only in the vertical direction. Hence, like the above-described holding by the robot arm, a wide space is not required around the stacked body 104 and problems, such as limitation of use conditions, are not caused.

However, in the case of the sucking-conveying device 101, failures mentioned below may occur. That is, the setter for firing 100, for example, to be conveyed in this case is formed of a porous material obtained by press molding a ceramic material and then firing it. Thus, as shown in FIG. 10, in a case of closely contacting the suction section 102 with a setter for firing 100a positioned at the uppermost stage of the stacked body 104 and attempting to lift the setter for firing 100a, a setter for firing 100b positioned at the lower stage may be also sucked together and lifted (refer to a stacked body in the middle of FIG. 10).

Consequently, there may be caused a conveyance failure in which the setters for firing 100a and 100b conveyed in a state of being stacked in two stages are directly placed on the shelf plate. Note that, a state in which a plurality of setters for firing are stacked in two or more stages is referred to herein as "suction".

In addition, it is also examined to establish an optimum condition capable of sucking the setters for firing 100a for each stage by adjusting the suction force of the sucking-conveying device 101. However, the setter for firing 100a needs to be finely adjusted depending on unevenness of the surface and various suction conditions, and thus it has been difficult to stabilize a grasping condition of the setter for firing 100a.

That is, if the suction force is too weak, the setter for firing 100a at the uppermost stage cannot be surely lifted, which may cause failures, such as coming off of the setter for firing 100a from the suction section 102 during conveyance. On the other hand, if the suction force is too strong, as described above, the setters for firing 100a and 100b at the plural stages are collectively conveyed, and the above conveyance failure may still not be eliminated.

Therefore, the present invention is made in view of the above situations and aims to provide a setter for firing capable of suppressing occurrence of conveyance failure in automation of work, such as conveyance and placement of the setter for firing by using a sucking-conveying device and a method for producing a honeycomb structure.

Means for Solving the Problem

According to the present invention, a setter for firing and a method for producing a honeycomb structure which solve the above problem are provided.

According to a first aspect of the present invention, a setter for firing in a plate is provided which is used for firing a honeycomb formed body and interposed between the honeycomb formed body and a shelf plate, wherein the setter for firing has a setter lower surface section facing the shelf plate, the setter lower surface section including: a central region part formed by a region including a lower surface center of the setter lower surface section; and a peripheral region part formed by a peripheral region of the central region part, and the peripheral region part has at least four or more setter groove parts each having a recessed cross sectional shape and extending radially from the lower surface center respectively in a direction from a boundary with the central region part toward a setter outer circumferential section.

According to a second aspect of the present invention, the setter for firing according to the first aspect provided, wherein the setter groove parts adjacent to each other are arranged in the peripheral region part with a same radiation angle from the lower surface center, and extend linearly from the boundary toward the setter outer circumferential section.

According to a third aspect of the present invention, the setter for firing according to the first or second aspects is provided, wherein the central region part is formed in a circular shape and has a diameter in a range of 10 mm to 35 mm.

According to a fourth aspect of the present invention, the setter for firing according to the first or second aspects is provided, wherein the setter for firing is formed in an elliptical shape, and the central region part is formed in an elliptical shape similar to that of the setter for firing and has a minor axis in a range of 10 mm to 35 mm.

According to a fifth aspect of the present invention, the setter for firing according to any one of the first to fourth aspects is provided, wherein each of the setter groove parts has a groove width in a range of 0.5 mm to 2.0 mm.

According to a sixth aspect of the present invention, the setter for firing according to any one of the first to fifth aspects if provided, wherein a ratio of a groove area of the setter groove parts to a total area of the setter lower surface section is at least 1.0% or more.

According to a seventh aspect of the present invention, the setter for firing according to any one of the first to sixth aspects is provided, wherein a setter upper surface section opposing the setter lower surface section and having the honeycomb formed body placed thereon includes: a flat part in contact with at least a portion of a formed body end face of the honeycomb formed body; and a raised part in a curved surface shape raised bulgingly from the setter outer circumferential section toward the flat part.

According to an eighth aspect of the present invention, a method for producing a honeycomb structure is provided using a setter for firing, the method including: a molding step of extruding a honeycomb formed body from a molding material; and a firing step of firing the honeycomb formed body obtained by the molding step, the firing step including a shelf plate arrangement step of arranging a shelf plate in a firing furnace, a setter for firing installation step of installing the setter for firing on the arranged shelf plate with a setter lower surface section facing the shelf plate, the setter for firing including a central region part formed by a region including a lower surface center of the setter lower surface section and a peripheral region part formed by a peripheral region of the central region part, and the peripheral region part having at least four or more setter groove parts formed therein each having a recessed cross sectional shape and extending radially from the lower surface center respectively in a direction from a boundary with the central region part toward a setter outer circumferential section, and a honeycomb formed body placement step of placing the honeycomb formed body on the setter for firing with one formed body end face directed downwardly and placing the honeycomb formed body in the firing furnace with the setter for firing interposed between the honeycomb formed body and the shelf plate.

According to a ninth aspect of the present invention, the method for producing a honeycomb structure using a setter for firing according to the eighth aspect is provided, wherein the setter for firing installation step uses a sucking-conveying device, and further includes a sucking-conveying step of closely contacting a suction section of the sucking-conveying device to a setter upper surface section of the setter for firing positioned at an uppermost stage of a stacked body in which a plurality of the setters for firing are stacked in multiple stages and conveying the setter for firing in a decompression state between the suction section and the setter upper surface section.

Effect of the Invention

According to the setter for firing of the present invention, occurrence of the conveyance failure when the setter for firing is conveyed by use of suction force can be suppressed. Further, according to the method for producing a honeycomb structure of the present invention, the honeycomb structure can be formed by firing a honeycomb formed body in a state of suppressing occurrence of the conveyance failure of the setter for firing in a firing step. Particularly, work of installing the setter for firing on a shelf plate by using a sucking-conveying device can be performed stably and efficiently.

DETAILED DESCRIPTION OF THE INVENTION

Figure 1:
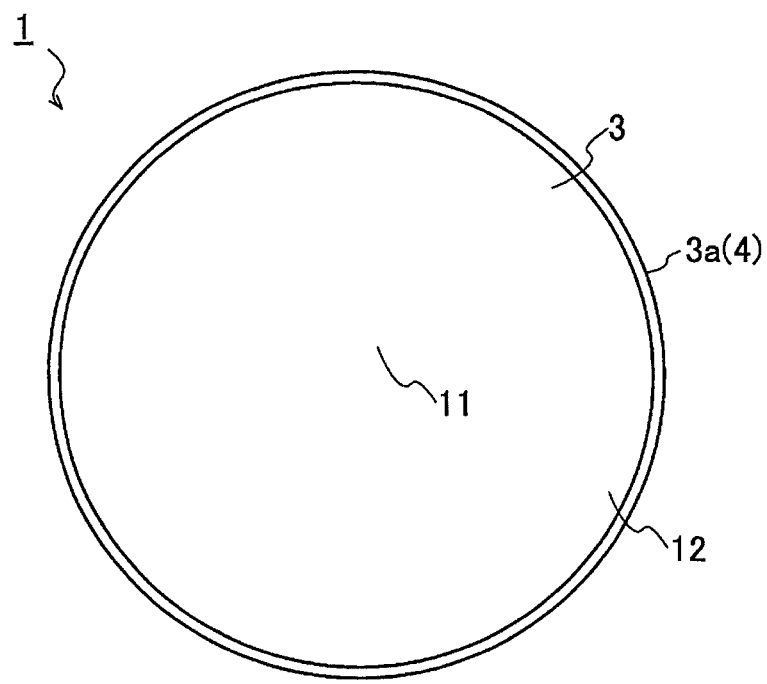
FIG. 1 is a plan view showing a schematic configuration of a setter for firing of one embodiment of the present invention.
Figure 2:
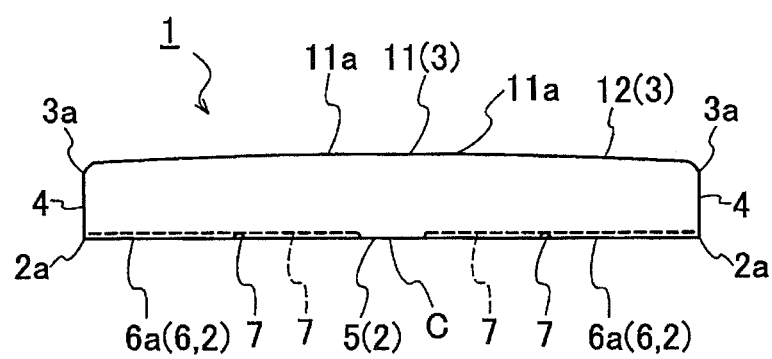
FIG. 2 is a front view showing a schematic configuration of the setter for firing.
Figure 3:
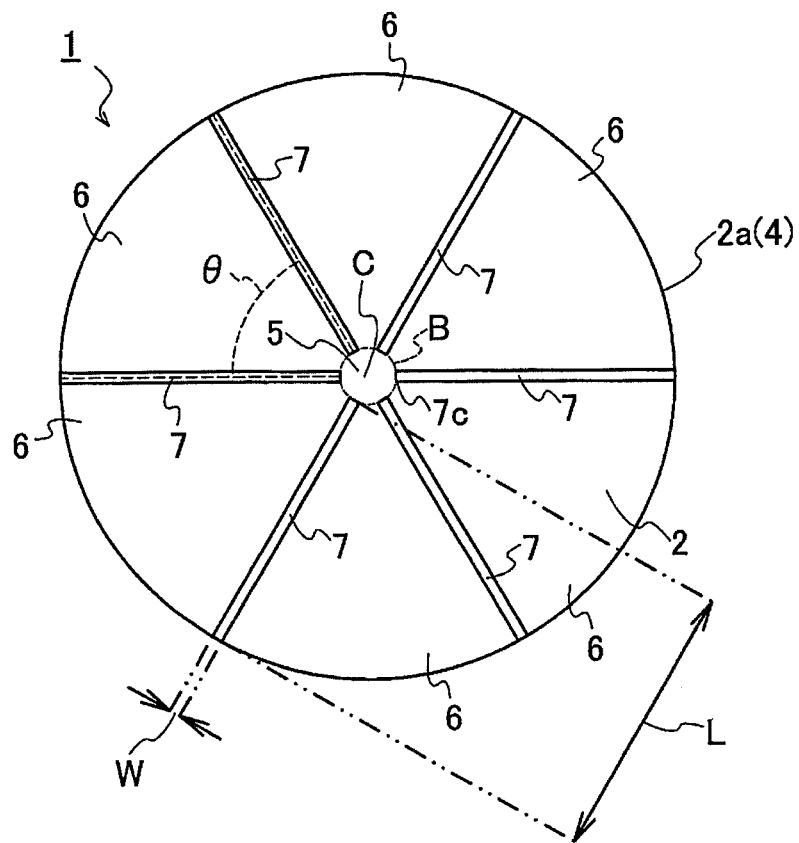
FIG. 3 is a bottom view showing a schematic configuration of the setter for firing.
Figure 4:
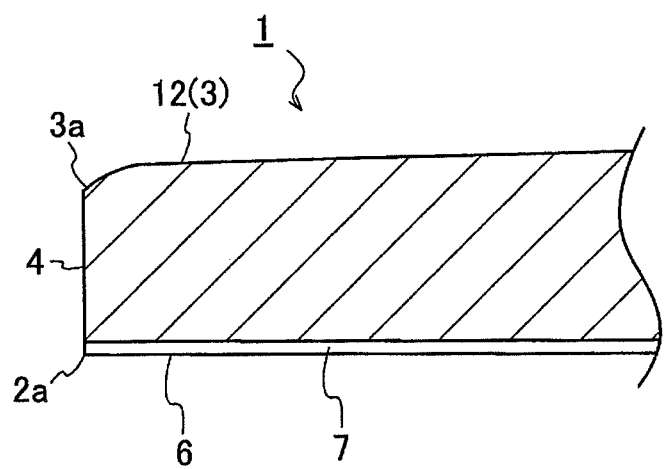
FIG. 4 is a partially enlarged section view seen from a side showing a schematic configuration of the setter for firing.
Figure 5:
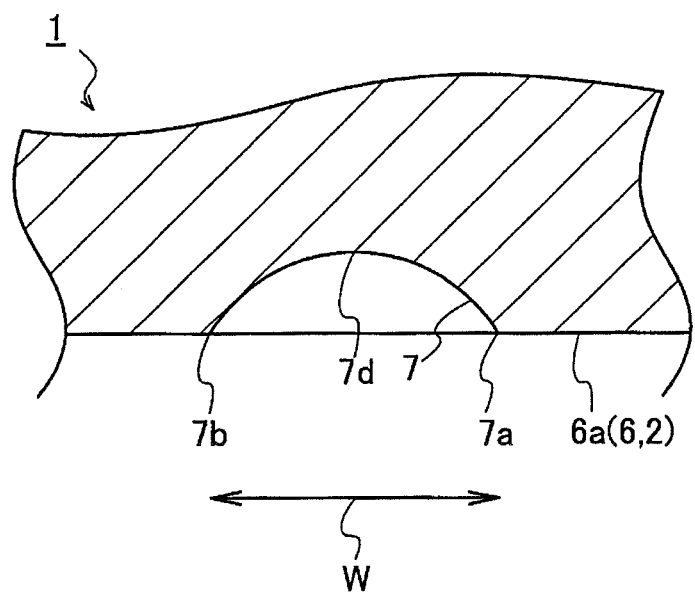
FIG. 5 is a partially enlarged section view seen from a side showing a configuration of a setter groove part of the setter for firing.
Figure 6:
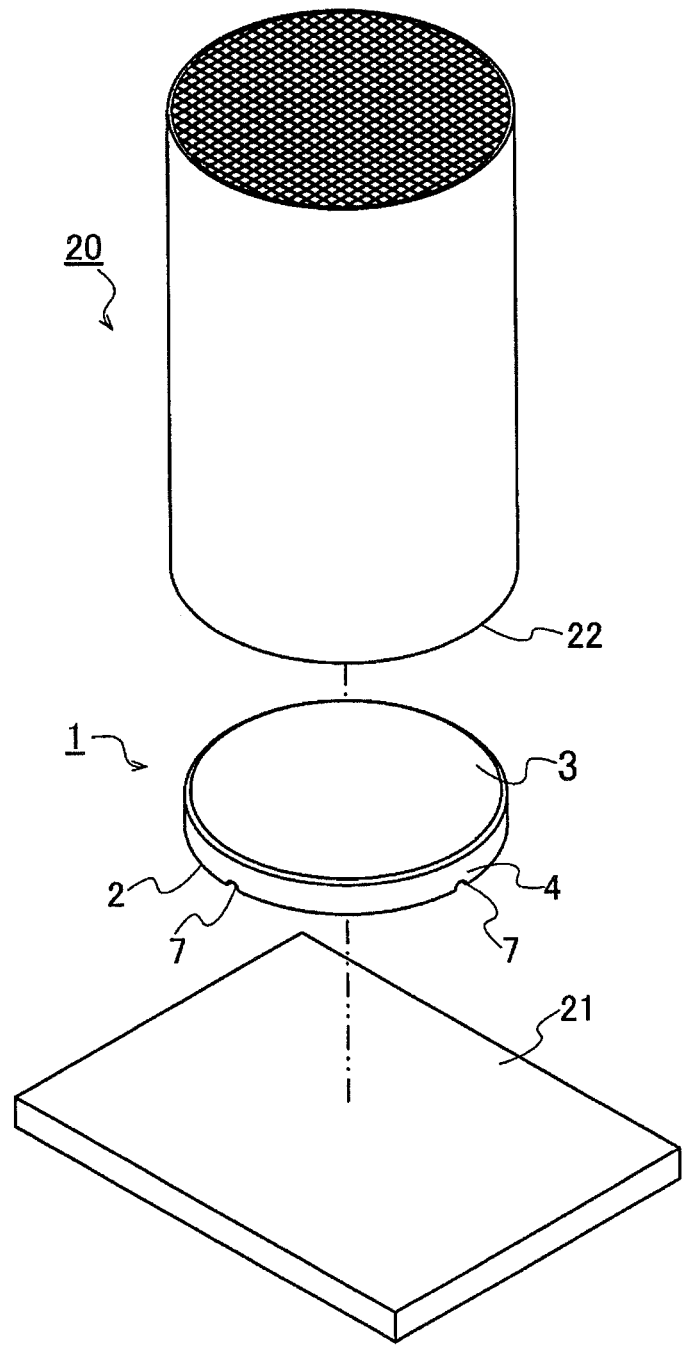
FIG. 6 is an exploded perspective view showing a honeycomb formed body before firing, a setter for firing, and a shelf plate.

Hereinafter, Embodiments of a setter for firing and a method for producing a honeycomb structure using the setter for firing of the present invention are described in detail with reference to drawings. Note that, the setter for firing and the method for producing a honeycomb structure of the present invention are not limited to the embodiments below, but can be variously changed, modified, and improved in design within a range not deviating from the scope of the present invention.

A setter for firing 1 of one embodiment of the present invention is, as shown in FIGS. 1 to 6, interposed between a honeycomb formed body 20 to be fired and a shelf plate 21 and is a porous disk-shaped member in a substantially disk shape formed of a ceramic material. The setter for firing 1 is obtained by firing the honeycomb formed body 20 at a predetermined firing temperature and used in a firing step of a method for producing a honeycomb structure for forming the honeycomb structure (not shown).

To describe more specifically, the setter for firing 1 includes a setter lower surface section 2 that is a surface facing the shelf plate 21 and positioned on a lower side of the setter for firing 1, a setter upper surface section 3 that is opposite to the setter lower surface section 2, at least partially contacts a formed body end face 22 of the honeycomb formed body 20, and is positioned on an upper side of the setter for firing 1, and a setter outer circumferential section 4 that connects respective end parts 2a and 3a of the setter lower surface section 2 and the setter upper surface section 3 and is positioned on a side face side of the setter for firing 1.

When the setter for firing 1 is seen from the bottom side (corresponding to the lower side of the paper surface in FIG. 2), the setter lower surface section 2 in a circular shape includes a central region part 5 formed by a region including a lower surface center C and a peripheral region part 6 formed by a region surrounding the central region part 5. Further, in the peripheral region part 6, six setter groove parts 7 radially and linearly extending from the lower surface center C are provided in a direction from a boundary B (refer to a dashed circle in FIG. 3) between the central region part 5 and the peripheral region part 6 toward the setter outer circumferential section 4.

Here, in the setter for firing 1 of the present embodiment, each of the setter groove parts 7 is formed as a groove having a substantially semicircular shape in cross-section (a recessed cross-sectional shape) to a flat region surface 6a of the peripheral region part 6 (setter lower surface section 2). Here, the distance between one end 7a and the other end 7b between the setter groove part 7 having a substantially semicircular shape in cross-section and the region surface 6a corresponds to a groove width W of the setter groove part 7. Note that, the shape of the setter groove part 7 is not limited to the substantially semicircular shape in cross-section, but may be another shape, for example, such as a multangular shape or an elliptical shape.

Further, in a plurality of the linear setter groove parts 7 provided radially in the setter lower surface section 2, an angle between the setter groove parts 7 adjacent to each other (radiation angle $\theta$: refer to FIG. 3) is set to 60°. That is, with the lower surface center C as a starting point, the plurality of setter groove parts 7 are arranged at equal intervals, respectively. Note that, the number of setter groove parts 7 provided in the setter lower surface section 2 is not limited to the above six. That is, the setter groove parts 7 may be provided in the number of at least four or more and arranged at equal intervals with the same radiation angle $\theta$ between the respective setter groove parts 7. For example, in the case of four, the radiation angle $\theta=90°$, in the case of five, the radiation angle $\theta=72°$, and in the case of eight, the radiation angle $\theta=45°$.

Furthermore, the central region part 5 provided in the setter lower surface section 2 is, in the case of the setter for firing 1 of the present embodiment, configured in the circular shape, and at this time the diameter of the central region part 5 is set in a range of 10 mm to 35 mm. That is, the lower limit and the upper limit of a region size (area) of the central region part 5 are set.

Here, if the diameter of the central region part 5 is smaller than 10 mm, center side ends 7c of the plurality of setter groove parts 7 are concentrated to the lower surface center C. To avoid such a state, the diameter is prescribed to be at least 10 mm or more. On the other hand, if the diameter of the central region part 5 exceeds 35 mm, the ratio of the central region part 5 in the setter lower surface section 2 is high. Consequently, the effect of the present invention (to be described below in detail) obtained by the setter groove parts 7 of the peripheral region part 6 cannot be sufficiently expected. Therefore, the range of the diameter of the central region part 5 is prescribed as described above.

Note that, in a case where the setter for firing of the present invention is, for example, configured in an elliptical shape, the central region part may also be configured in an elliptical shape similar to the shape of the setter for firing. In this case also, by the same reason as above, to avoid concentration in the center side ends 7c of the plurality of setter groove parts 7, the minor axis of the elliptical shape is set to be at least 10 mm or more. Note that, even if the setter for firing has, as described above, an elliptical shape, the shape of the central region part does not necessarily have to be elliptical, but may be circular. Further, the shape of the central region part does not necessarily have to be limited to a circular shape or an elliptical shape, but may be other multangular shape.

Figure 10:
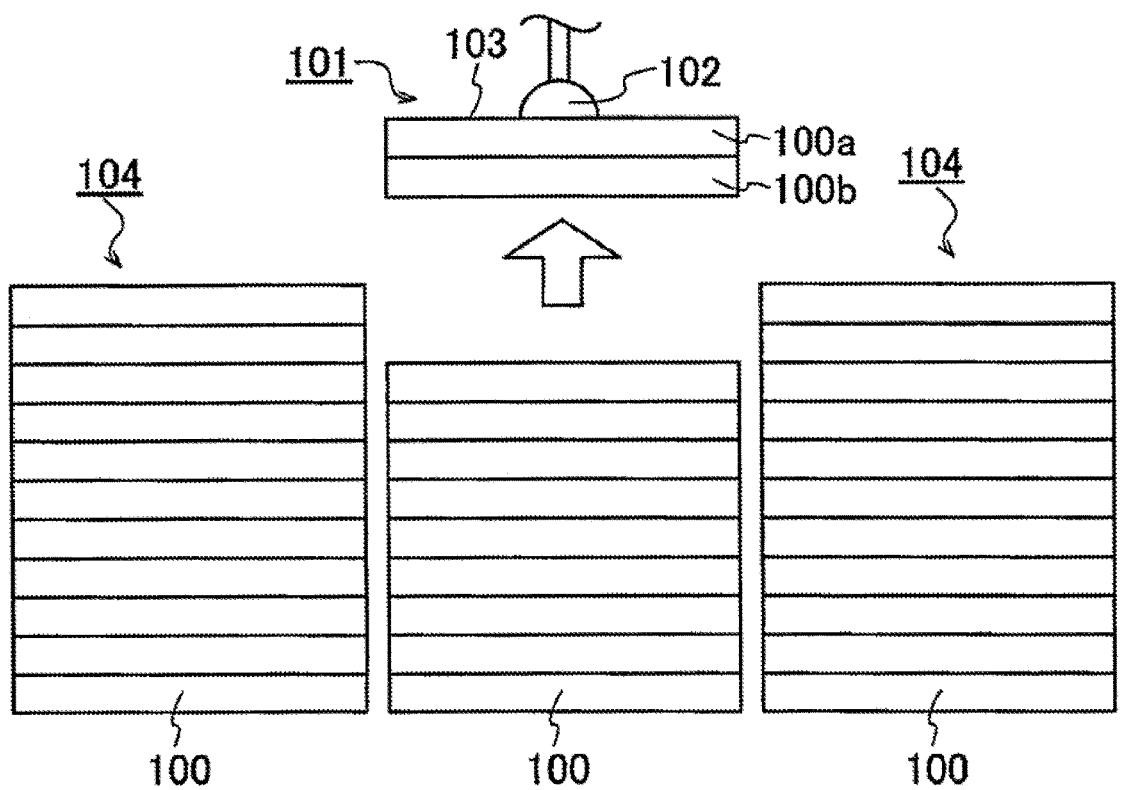
FIG. 10 is an explanatory diagram showing one example of conveyance of a conventional setter for firing.

In addition, the groove width W of the setter groove part 7 is in a range of 0.5 mm to 2.0 mm. In the case of the setter groove part 7 of the present embodiment, the height from the region surface 6a of the peripheral region part 6 to the deepest portion 7d of the setter groove part 7 is not more than ½ of the groove width W. If the groove width W is smaller than 0.5 mm, in a case of a stacked body 8 in which the setters for firing 1 are stacked in multiple stages, a gap is hard to be generated between a setter for firing 1a at an upper stage position and a setter for firing 1b at a lower stage position, and similar to the conventional setter for firing 100 (refer to FIG. 10), the setters for firing 1a and 1b at the upper and lower stages closely contact with each other to increase possibility of entering the suction state.

Thus, the groove width W needs to be at least 0.5 mm or more. In addition, if the groove width W is not more than 2.0 mm, a sufficient gap is formed between the setters for firing 1a and 1b at the upper and lower stages, and thus further expansion of the groove width W is not necessary. Therefore, the groove width W of the setter groove part 7 is prescribed in the above-described range of 0.5 mm to 2.0 mm.

Meanwhile, in the setter for firing 1 of the present embodiment, the ratio of the groove area (groove area ratio) of the setter groove part 7 in the total area of the setter lower surface section 2 is set to be at least 1.0% or more. Here, the total area of the setter lower surface section 2 indicates a total of the area of the central region part 5, the area of the peripheral region part 6 excluding the setter groove part 7, and the area of a portion opened to the exterior of the setter groove part 7.

Note that, since the setter for firing 1 of the present embodiment is circular, the total area of the setter lower surface section 2 can be calculated based on the diameter of the setter for firing 1 (=(diameter/2)$^2 \times \pi$). Meanwhile, the groove area in the case of the setter for firing 1 of the present embodiment is calculated by further multiplying the area of a rectangular region, which is obtained by multiplying the groove width W by a groove length L of the setter groove part 7 extending from the boundary B to the setter outer circumferential section 4, by six that is the number of the setter groove parts 7 (refer to FIGS. 3 and 5). The groove area ratio is calculated based on the respectively obtained groove area and the total area of the setter lower surface section 2. Thus, the groove area ratio can be simply obtained.

Note that, in a case where the above calculation method cannot be employed for the setter for firing of the present invention, for example, in a case where the setter for firing is formed by other than the above-described circular shape, the groove area ratio may be calculated by another method. For example, image analysis processing is performed on a captured image obtained by imaging the setter lower surface section 2 to discriminate the region of the setter groove part from the other regions, and the groove area ratio may be obtained.

Further, the setter upper surface section 3 of the setter for firing 1 of the present embodiment, which opposes the setter lower surface section 2 and has the honeycomb formed body 20 placed thereon, includes a flat part 11 in a flat shape in contact with at least a portion of the formed body end face 22 of the honeycomb formed body 20 and a raised part 12 in a curved surface shape raised bulgingly from the upper end (corresponding to an end portion 3a of the setter upper surface section 3) of the setter outer circumferential section 4 toward a flat part edge 11a of the flat part 11. That is, when the setter for firing 1 of the present embodiment is seen from a side, the setter lower surface section 2 is formed in a flat shape so as to contact the shelf plate 21, and a portion of the setter lower surface section 2 is molded into a semicircular shape in cross-section. Meanwhile, the setter upper surface section 3 is raised upward as a whole, and only the vicinity of the center is formed by the flat part 11.

Note that, not limited particularly, but for example, the central region part 5 of the setter lower surface section 2 may have the same area as the flat part 11 of the setter upper surface section 3, or the flat part 11 may be formed with a larger area than the central region part 5. Further, the shape of the flat part 11 is not limited to a circular shape, but may be a shape allowing stable placement of the honeycomb formed body 20.

Figure 7:
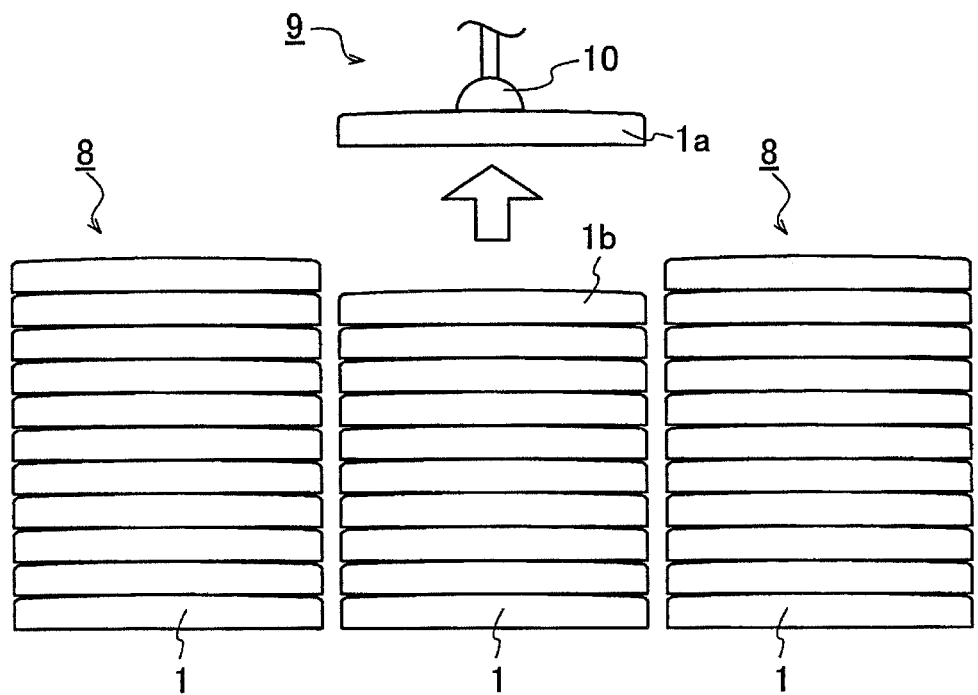
FIG. 7 is an explanatory diagram showing one example of conveyance of the setter for firing.

Since the setter upper surface section 3 includes the flat part 11, the honeycomb formed body 20 can be placed stably, and further since only a portion of the formed body end face 22 contacts the setter upper surface section 3, the possibility of constraining firing shrinkage at the time of firing becomes low. Consequently, in a case where firing is performed by using the setter for firing 1 of the present embodiment, it is possible to stabilize product quality without causing cell deformation or partition wall cutting in the honeycomb structure after firing (not shown), Further, when the setter for firing 1 is stored in the storage case or the like, the stacked body 8 in which a plurality of setters for firing 1 are stacked in multiple stages is constructed (refer to FIG. 7). At this time, since the setter for firing 1 includes the setter lower surface section 2 (particularly, the central region part 5) and the flat part 11 formed by the plane parallel to the setter lower surface section 2, the setters for firing 1 at the upper stage side and the lower stage side when the setters for firing 1 are stacked in multiple stages are not in an unstable state. Thus, the stacked body 8 can be stored in a stable state in the storage case or the like.

As described above, the setter for firing 1 of the present embodiment includes a plurality of setter groove parts 7 in the peripheral region part 6 of the setter lower surface section 2. Consequently, even in a case of conveying, from the stacked body 8 (refer to FIG. 7) in which a plurality of setters for firing 1 are stacked in multiple stages, only one setter for firing 1 by using a sucking-conveying device 9 and by closely contacting a suction section 10 with the setter upper surface section 3 of the setter for firing 1a positioned at the uppermost stage of the stacked body 8 to reduce the pressure, the setter for firing 1a positioned at the uppermost stage does not closely contact with the setter for firing 1b positioned at the lower stage thereof (sucking-conveying step).

That is, a passage where air flows is formed between the setter for firing 1a at the upper stage side and the setter for firing 1b at the lower stage side via the setter groove part 7. As a result, the above-described suction state by the setters for firing 1a and 1b at the upper and lower stages is avoided. Note that, at a phase where the setter for firing 1a positioned at the uppermost stage is conveyed, the setter for firing 1b at the lower stage side turns into a setter for firing 1a at the uppermost stage in the stacked body 8. Conveyance of the setter for firing 1a at the uppermost stage in the stacked body 8 by the sucking-conveying device 9 is repeated, and the conveying work is continued until there is no setter for firing 1 in the stacked body 8. Note that, in a case where the setters for firing 1 placed on the shelf plate are recovered to form the stacked body 8, an inverse operation to the above processing is performed.

Particularly, since the groove width W of the setter groove part 7 is set in the range of 0.5 mm to 2.0 mm, the passage where air flows is sufficiently formed, and it becomes possible to selectively lift only the setter for firing 1a at the uppermost stage by the suction section 10 of the sucking-conveying device 9. Further, to sufficiently secure the passage where air flows, the groove area ratio of the groove area of the setter groove part 7 to the total area of the setter lower surface section 2 is set to at least 1.0% or more. If the groove area ratio of the setter groove part 7 is lower than 1.0%, the passage where air flows is not sufficient, the two setters for firing 1a and 1b closely contact with each other to enter the suction state and there is a possibility that they are lifted by the suction section 10. Therefore, the groove area ratio is prescribed in the above range.

The setter for firing 1 of the present embodiment is, as described above, formed of a ceramic material. The material is not particularly limited, and, for example, may use various materials that have been conventionally used as basis materials of the setter for firing. For example, it is possible to use materials that are converted into mullite, cordierite, silicon carbide, alumina, or the like by being fired at high temperatures.

In addition, the method for forming the setter for firing 1 is not particularly limited. For example, after forming a general disk-shaped setter for firing, it is possible to grind the setter upper surface section 3 so as to have the flat part 11 and the raised part 12 and to further provide a plurality of the setter groove parts 7 in the setter lower surface sections 2, respectively, by grinding work. However, since a large number of setters for firing are used in the firing step, performing the cutting work on each of the setters for firing may lead to complication of production process and rising of production cost of the setter for firing.

Thus, for example, the method may use a molding die for press work formed according to a shape of the setter for firing, fill the molding die with ceramic materials serving as raw materials, and form the setter formed body by applying desired press pressure thereto. The setter for firing can be produced by applying the press pressure and then firing the setter formed body taken out from the molding die. This makes it possible to manufacture press setters made of ceramics in large amount and to use the press setters as the setters for firing of the present invention.

The setter for firing and the method for producing a honeycomb structure of the present invention will be described below based on examples described below, but the setter for firing and the method for producing a honeycomb structure of the present invention are not limited to the examples.

EXAMPLES (1) Production of a Setter for Firing

Setters for firing in which shapes of the setters for firing, the numbers of the setter grooves, radiation angles θ, diameters (center diameters) of the central region parts, and groove area ratios are different from each other were produced (Examples 1 to 9). In addition, setters for firing the conditions of which are deviated from those prescribed for the setter for firing of the present invention were further produced (Comparative Examples 1 to 6). The other characteristics of the setters for firing other than the above parameters are the same, and each of the setters for firing is composed of mullite having a bulk specific gravity of about 2.1 g/cm$^3$, a porosity of about 27%, a bend strength of 5 MPa or more, and a surface roughness Ra of 10 μm or less, has a diameter of 115 mm (in the case of an elliptical shape, a minor axis of 115 mm, a major axis of 135 mm), and has a flat part and a raised part in the setter upper surface section. In addition, the setter for firing is a press-molded porous press setter and fired at a firing temperature of 1400 to 1500° C.

(2) Setters for Firing of Examples and Comparative Examples

In the setters for firing of Examples 1 to 9, based on the setter for firing of Example 3 which has six grooves, the radiation angle θ of 60°, the center diameter of 25 mm, and the groove width of 2 mm, that of Example 1 has four grooves and the radiation angle θ of 90°, that of Example 2 has five grooves and the radiation angle θ of 72°, and that of Example 4 has eight grooves and the radiation angle θ of 45°. That is, in Examples 1 and 2 and Example 4, the numbers of grooves and the radiation angles θ were respectively changed from Example 3.

Meanwhile, each of the setters for firing of Examples 5 and 8 has an elliptical shape, that of Example 5 has the elliptical central region part with the minor axis of 25 mm, and that of Example 8 has the circular central region part with the center diameter of 25 mm. In addition, based on the setter for firing of Example 3, in Example 6, the diameter (center diameter) of the central region part was changed to 10 mm, and in Example 7, the center diameter was changed to 35 mm, respectively from Example 3. Further, in Example 9, the groove width W was set to 0.5 mm.

In contrast to this, in a setter for firing of Comparative Example 1, one setter groove part having a groove width W of 2 mm was arranged in a diameter direction, in Comparative Example 2, similar one pair of setter groove parts was arranged in parallel, and in Comparative Example 3, four setter groove parts were arranged in a lattice shape. That is, they are deviated from the conditions of the setter for firing of the present invention that the setter groove parts are arranged radially.

Figure 8:
FIG. 8 is a table showing an evaluation result of setters for firing of Examples 1 to 9.
Figure 8:
Figure 8:
Figure 8:
Figure 8:
Figure 8:
Figure 8:
Figure 8:
Figure 8:
Figure 9:
FIG. 9 is a table showing an evaluation result of setters for firing of Comparative Examples 1 to 6.
Figure 9:
Figure 9:
Figure 9:
Figure 9:
Figure 9:

Further, in Comparative Example 4, six setter groove parts were arranged radially, but they crossed one another at the lower surface center of the setter lower surface section. That is, the central region part does not exist (center diameter=0 mm) In addition, in Comparative Example 5, the groove width W of the setter groove part is 0.3 mm, and in Comparative Example 6, the groove width W of the setter groove part is 5 mm Summaries of detail specifications, such as shapes of the setters for firing, of Examples 1 to 9 and Comparative Examples 1 to 5 are shown in FIGS. 8 and 9, respectively.

(3) Evaluation of Setters for Firing

By use of the above-described setters for firing, there were evaluated product qualities, such as whether or not suction of the setters for firing at the upper stage side and the lower stage side has occurred by the suction section of the sucking-conveying device, shape change of the setter for firing after actual firing of the honeycomb formed body, and whether or not there were cell deformation and partition wall cutting in the fired honeycomb structure.

(4) Evaluation Criteria (Suction)

Note that, about evaluation of suction of the setters for firing, a case where suction between the setters for firing at the upper stage side and the lower stage side did not occur was evaluated as "A", a case where the setter for firing at the lower stage side was lifted slightly was evaluated as "B", and a case of suction state where the setters for firing at the upper and lower stage sides were overlappingly lifted was evaluated as "C". At this time, a suction pressure of the sucking-conveying device was set to 19 kPa.

(5) Evaluation Criteria (Shape Change after Firing)

The firing step of firing the honeycomb formed body, which is one step in the method for producing the honeycomb structure, by actually using the setter for firing was performed and the shape change of the setter for firing was checked. Note that, the honeycomb formed body to be fired used the one obtained by extruding molding materials (kneaded materials) adjusted to a predetermined compounding ratio by using a well-known extruder (molding step). The firing step includes a shelf arrangement step of arranging the shelf plate in a firing furnace, a setter for firing installation step of installing the setter for firing produced as described above on the shelf plate, and a honeycomb formed body placement step of placing the honeycomb formed body further on the setter for firing with one formed body end face directed downwardly. Thus, a state was set where the setter for firing was interposed between the honeycomb formed body and the shelf plate. In such a state, the honeycomb formed body was thrown into the firing furnace and fired. Thus, production of the honeycomb structure was completed (the method for producing a honeycomb structure of the present invention). Here, the firing step under the same condition was repeatedly performed on one setter for firing, and the setter for firing that was fired 10 times and had warpage of 0.5 mm or less was evaluated as "A", the one that was fired 6 to 9 times and had warpage of 0.5 mm or less was evaluated as "B", and the one that was fired 5 times or less and had warpage of 0.6 mm or more was evaluated as "C".

(6) Evaluation Criteria (Product Quality)

The fired honeycomb structure having no cell deformations or partition wall cuttings and having good product quality was evaluated as "A", the one having not more than four cell deformations and partition wall cuttings was evaluated as "B", and the one having more than five cell deformations and partition wall cuttings was evaluated as "C".

(7) Evaluation Results

The evaluation results on respective evaluation criteria of above (4) to (6) are shown in FIGS. 8 and 9, respectively. As to the setter for firing having one groove of the setter groove part of FIG. 9 (Comparative Example 1), the one having two grooves (Comparative Example 2), or the one having grooves formed in a lattice shape (Comparative Example 3), the shape change of the setter for firing after firing was evaluated as "C", which showed that it was not suitable for repeated firing. That is, as prescribed in the setter for firing of the present invention, it was confirmed that at least four or more setter groove parts need to be provided in the setter lower surface section and they need to be arranged radially. Further, in the case of Comparative Examples 1 and 2, the product quality of the honeycomb structure after firing is also affected.

Further, even in a case where four or more setter groove parts were arranged radially, when the setter lower surface section did not include the central region part (Comparative Example 4), the shape change of the setter for firing after firing and the product quality of the honeycomb structure were evaluated as "C". That is, in the setter for firing of the present invention, it was shown that the central region part having no setter groove part formed in the setter lower surface section was an indispensable configuration.

Further, in a case where the groove width W of the setter groove part was as small as 0.3 mm and the groove area ratio was 0.8% (Comparative Example 5), since the passage of air was not sufficiently formed, the suction occurred between the setters for firing at the upper and lower stages, and thus it was evaluated as "C". In contrast to this, in a case where the groove width W of the setter groove part was 0.5 mm and the groove area ratio was 1.3% (Example 9), the above suction was not confirmed at all, and thus it was evaluated as "A". That is, it was shown that the setter groove part needs to be formed with the groove width W of 0.5 mm or more and the groove area ratio of 1.0% or more.

In contrast to this, in a case where the groove width W is 5 mm (Comparative Example 6), the suction did not occur but the product quality of the honeycomb structure degraded, and it was evaluated as "C". Therefore, the groove width W needs to be set in a proper range.

In addition, the setters for firing of Examples 1 to 9 were evaluated as at least "B" or higher in any of the evaluation criteria. Note that, from the evaluation result of Example 1, the number of grooves is more preferably five or more, and from the evaluation result of Example 7, it was confirmed that the center diameter was more preferably smaller than 35 mm. Further, it was confirmed that the shape of the setter for firing was not limited to a circular shape and even an elliptical shape (Examples 5 and 8) showed the same effect. As described above, using the setter for firing of the present invention makes it possible to produce the honeycomb structure in a stable condition.

INDUSTRIAL APPLICABILITY

The setter for firing of the present invention can be particularly effectively used in the firing step that is one step of the method for producing a honeycomb structure for producing a ceramic honeycomb structure to be used, for example, as catalyst carriers for purifying automobile exhaust gas. Furthermore, the method for producing the honeycomb structure using the setter for firing makes it possible to stably produce the honeycomb structure from the honeycomb formed body.

DESCRIPTION OF REFERENCE NUMERALS

1, 1*a*, 1*b*, 100, 100*a*, 100*b*: setter for firing, 2: setter lower surface section, 2*a*, 3*a*: end part, 3, 103: setter upper surface section, 4: setter outer circumferential section, 5: central region part, 6: peripheral region part, 6*a*: region surface, 7: setter groove part, 7*a*: one end, 7*b*: the other end, 7*c*: center side end, 7*d*: deepest portion, 8, 104: stacked body, 9, 101: sucking-conveying device, 10, 102: suction section, 11: flat part, 11*a*: flat part edge, 12: raised part, 20: honeycomb formed body, 21: shelf plate, 22: formed body end face, B: boundary, C: lower surface center, W: groove width, θ: radiation angle

The invention claimed is:

1. A setter for firing in a plate which is used for firing a honeycomb formed body and interposed between the honeycomb formed body and a shelf plate, wherein
    the setter for firing has a setter lower surface section facing the shelf plate, the setter lower surface section including:
    a central region part formed by a region including a lower surface center of the setter lower surface section; and
    a peripheral region part formed by a peripheral region of the central region part, and
    the peripheral region part has at least four or more setter groove parts each having a recessed cross sectional shape and extending radially from the lower surface center respectively in a direction from a boundary with the central region part toward a setter outer circumferential section without intersecting another setter groove part.

2. The setter for firing according to claim 1, wherein
    the setter groove parts adjacent to each other are arranged in the peripheral region part with a same radiation angle from the lower surface center, and extend linearly from the boundary toward the setter outer circumferential section.

3. The setter for firing according to claim 1, wherein
    the central region part is formed in a circular shape and has a diameter in a range of 10 mm to 35 mm.

4. The setter for firing according to claim 1, wherein
    the setter for firing is formed in an elliptical shape, and
    the central region part is formed in an elliptical shape similar to that of the setter for firing and has a minor axis in a range of 10 mm to 35 mm.

5. The setter for firing according to claim 1, wherein
    each of the setter groove parts has a groove width in a range of 0.5 mm to 2.0 mm.

6. The setter for firing according to claim 1, wherein
    a ratio of a groove area of the setter groove parts to a total area of the setter lower surface section is at least 1.0% or more.

7. The setter for firing according to claim 1, wherein
    a setter upper surface section opposing the setter lower surface section and having the honeycomb formed body placed thereon includes:
    a flat part in contact with at least a portion of a formed body end face of the honeycomb formed body; and
    a raised part in a curved surface shape raised bulgingly from the setter outer circumferential section toward the flat part.

8. A method for producing a honeycomb structure using a setter for firing, the method comprising:
    a molding step of extruding a honeycomb formed body from a molding material; and
    a firing step of firing the honeycomb formed body obtained by the molding step,
    the firing step including
    a shelf plate arrangement step of arranging a shelf plate in a firing furnace,
    a setter for firing installation step of installing the setter for firing on the arranged shelf plate with a setter lower surface section facing the shelf plate, the setter for firing including a central region part formed by a region including a lower surface center of the setter lower surface section and a peripheral region part formed by a peripheral region of the central region part, and the peripheral region part having at least four or more setter groove parts formed therein each having a recessed cross sectional shape and extending radially from the lower surface center respectively in a direction from a boundary with the central region part toward a setter outer circumferential section without intersecting another setter groove part, and
    a honeycomb formed body placement step of placing the honeycomb formed body on the setter for firing with one formed body end face directed downwardly and placing the honeycomb formed body in the firing furnace with the setter for firing interposed between the honeycomb formed body and the shelf plate.

9. The method for producing a honeycomb structure using a setter for firing according to claim 8, wherein
    the setter for firing installation step uses a sucking-conveying device, and
    further includes a sucking-conveying step of closely contacting a suction section of the sucking-conveying device to a setter upper surface section of the setter for firing positioned at an uppermost stage of a stacked body in which a plurality of the setters for firing are stacked in multiple stages and conveying the setter for firing in a decompression state between the suction section and the setter upper surface section.

* * * * *